(12) United States Patent
Mingus et al.

(10) Patent No.: US 8,652,557 B2
(45) Date of Patent: *Feb. 18, 2014

(54) WHOLE GRAIN PRODUCTS MADE WITH WHOLE GRAIN DURUM WHEAT

(75) Inventors: David J. Mingus, New Hope, MN (US); Steven J. Cox, Long Lake, MN (US); Robert T. Westercamp, Cedar Rapids, IA (US); Dennis L. Schlueter, St. Paul, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,230

(22) Filed: Sep. 20, 2011

(65) Prior Publication Data

US 2012/0040070 A1    Feb. 16, 2012

Related U.S. Application Data

(63) Continuation of application No. 11/212,860, filed on Aug. 26, 2005, now Pat. No. 8,057,833.

(60) Provisional application No. 60/604,875, filed on Aug. 27, 2004.

(51) Int. Cl.
*A21D 10/00* (2006.01)

(52) U.S. Cl.
USPC ................................................ 426/549

(58) Field of Classification Search
USPC ................................................ 426/549
See application file for complete search history.

(56) References Cited

U.S. PATENT DOCUMENTS

| | | | |
|---|---|---|---|
| 3,649,304 A | 3/1972 | Fehr, Jr. et al. | |
| 4,374,863 A | 2/1983 | Savage | |
| 4,956,190 A | 9/1990 | Chawan et al. | |
| 5,320,859 A | 6/1994 | Namdari | |
| 5,395,639 A | 3/1995 | Chawan et al. | |
| 5,462,758 A | 10/1995 | Ventres et al. | |
| 6,149,961 A | 11/2000 | Kepplinger et al. | |

(Continued)

FOREIGN PATENT DOCUMENTS

| | | |
|---|---|---|
| CA | 2141974 | 8/1995 |
| JP | 10028515 | 2/1998 |
| WO | WO 2005/058044 | 6/2005 |

OTHER PUBLICATIONS

"Specifications for U.S.A. Standard Testing Sieves". The Murdock Company Inc. Retrieved from www.murdockcompany.com on Oct. 24, 2012. pp. 1-5.* United States Department of Agriculture Dietary Guidelines for Americans, 2000 (no month), 5th Edition, pp. 14-15 and 20-21.
Machine Translation of JP10028515A, Takahama et al. Publication Date Feb. 3, 1998, pp. 1-10.
Liebman, Bonnie. "The Whole Grain Guide." Published Mar. 1997, retrieved from internet archieve. 2003, pp. 1-10.
Website Print-Out: *Recent Trends in Durum Wheat Milling and Pasta Processing: Impact on Durum Wheat Quality Requirements*, J.E. Dexter, B.A. Marchylo, Candian Grain Commission, Aug. 2004.
Website Print-Out: *Ultragrain Overview*, ConAgra Food Ingredients, Aug. 2005, 3 pgs.
*The Whole Grain Wake-Up Call*, E. Schroeder, Food Business News, Jun. 2005, 1 pg.
Heaton et al., "Particle Size of Wheat, Maize, and Oat Test Meals: Effects on Plasma Glucose and Insulin Responses and on the Rate of Starch Digestion in Vitro", American Journal of Clinical Nutrition, 1988, 47:675-82.

*Primary Examiner* — D. Lawrence Tarazano
*Assistant Examiner* — Jenna A. Watts
(74) *Attorney, Agent, or Firm* — John L. Crimmins; Aleya R. Champlin; J. Paul Haun (57) ABSTRACT

Whole grain baked products and mixes having milled whole grain durum wheat are provided. Whole grain durum baked products and mixes utilize milled whole grain durum flour having a generally white-like color wherein durum particulate matter is visually indistinguishable from durum fines by the unassisted eye. Through the use of milled whole grain durum flour, white-like whole grain durum products including white-like whole grain durum breads can be prepared that satisfy generally accepted color and baking performance characteristics for traditional white breads.

15 Claims, 1 Drawing Sheet

(56) References Cited

U.S. PATENT DOCUMENTS

| | | |
|---|---|---|
| 6,413,562 B2 | 7/2002 | Conforti et al. |
| 6,457,250 B1 | 10/2002 | Mingus et al. |
| 6,660,311 B2 | 12/2003 | Goedeken et al. |
| 6,706,305 B2 | 3/2004 | Wolt et al. |
| 6,881,429 B2 | 4/2005 | Geng et al. |
| 2003/0082287 A1 | 5/2003 | Wolt et al. |
| 2003/0104103 A1 | 6/2003 | Monsalve-Gonzalez et al. |
| 2003/0147998 A1 | 8/2003 | Geng et al. |
| 2003/0152667 A1* | 8/2003 | Goedeken et al. ............... 426/94 |
| 2004/0241303 A1 | 12/2004 | Levin et al. |
| 2006/0073240 A1 | 4/2006 | David et al. |
| 2006/0246198 A1 | 11/2006 | Mingus et al. |

* cited by examiner

WHOLE GRAIN PRODUCTS MADE WITH WHOLE GRAIN DURUM WHEAT

PRIORITY CLAIM

The present application is a continuation application of, and claims the benefit of priority to, U.S. Nonprovisional application Ser. No. 11/212,860, filed on Aug. 26, 2005 and entitled "WHOLE GRAIN PRODUCTS MADE WITH WHOLE GRAIN DURUM WHEAT," issued on Nov. 15, 2011, as U.S. Pat. No. 8,057,833, which claims priority to U.S Provisional Application No. 60/604,875, filed Aug. 27, 2004, and is entitled, "WHOLE GRAIN PRODUCTS MADE WITH WHOLE GRAIN DURUM WHEAT," both of which are herein incorporated by reference in their entirety.

FIELD OF THE INVENTION

The invention relates generally to baking products with whole grains. The invention relates more particularly to whole grain products made with whole grain durum wheat.

BACKGROUND OF THE INVENTION

For centuries, grains have been grown and harvested as one of the most basic food staples. Grains including corn, wheat, rye, oats and others are traditionally ground into flour for use as the main building block for making a variety of baked goods including breads, pastas, tortillas and dessert items.

Regardless of the grain type, the individual grain kernels comprise a fibrous exterior shell referred to as bran, an interior starch portion called the endosperm, and a nutrient-rich core called the germ. During milling of the grain kernels, processes can be used to separate and remove the bran and germ from the endosperm resulting in a refined grain that is almost pure starch. While refined grains have advantages such as appearance and consistency, health studies have suggested that diets high in starches, like those from refined grains, play a role in certain unhealthy conditions such as obesity, heart disease and diabetes among others. Conversely, many of these same studies have indicated that the use of whole grains or grains that contain the entire kernel including the bran, endosperm and germ, promote certain health advantages.

One reason suggested for the health advantages associated with whole grains is that the bran and germ are both the nutrient-rich portions of the grain kernel and include concentrated portions of essential vitamins and nutrients. Further, the fibrous make-up of bran provides an excellent source of dietary fiber. Studies have shown that diets rich in whole grains can reduce the risks of heart disease, diabetes and certain cancers. Furthermore, other studies have suggested that individuals who consume whole grains tend to eat less and as a consequence, may weigh less or lose weight.

Various wheat varieties are grown for food production, each one being generally used in baking applications that are suited to the specific traits and characteristics of the wheat. Six classes of wheat are Hard Red Winter (HRW) wheat, Hard Red Spring (HRS) wheat, Hard White (HW) wheat, Soft White (SW) wheat, Soft Red Winter (SRW) wheat and durum wheat. Durum wheat is considered one of the hardest of all the wheat classes and is generally considered to be an expensive wheat. Due to durum wheat's unique protein/starch binding, durum wheat is generally considered hard and unsuitable for use in the production of white-style breads having a light and airy texture.

To date, durum has typically been used when it is milled and refined to form a coarse, granular product called semolina flour which provides the grain constituent for pasta products, such as spaghetti, macaroni and the like. Pasta products generally comprise semolina flour, water and eggs that are extruded at high pressures (about 50 psig or greater) and at temperatures at or above 100° F. These semolina based pasta products are extruded under high shear conditions and comprise compressed and/or compacted structures as opposed to having an airy, internal gluten structure common with traditional baked products such as, for example, breads, bagels, muffins, croissants and the like.

While the use of whole grains in baking provides numerous health benefits, the use of whole grains can lead to a significant difference in appearance compared to traditional white breads made with refined wheat, such as refined HRW and HRS wheat. In particular, the use of whole grains in baking products can result in visual particulate matter that is viewable and distinguishable in the final baked product due to color differences between the bran, endosperm and germ. To the consumer, the presence of visual particulate matter and color differences may be less preferred than, for example refined, white-style bread, which tends to have very uniform color and generally no visible particulates.

SUMMARY OF THE INVENTION

The invention addresses the aforementioned needs of providing a white-like whole grain product that includes whole grains while eliminating the visually distinct particulate matter commonly attributed to using whole grains. In particular, presently contemplated embodiments can comprise a whole grain product such as whole grain breads, dough products, mixes and biscuits made with whole grain durum flour. Representative embodiments of whole grain products contemplated by the present disclosure are advantageous in that they incorporate the health advantages associated with whole grains while eliminating the characteristic, visual color differences noticeable within the crumb due to particulates found in traditional whole grain products.

Within the scope of the disclosure, milling whole grain durum wheat has been found to produce a flour having a substantially homogeneous off-white color. Although not wishing to be bound by theory, it is presently believed that the substantially homogeneous off-white color results from one of the unique properties of durum wheat wherein both the exterior and interior portions of the durum grain kernel have the same off-white color. Since the particulate matter and the milled grain fines share the same off-white color, the particulate matter is substantially indistinguishable and generally unrecognizable within the final baked whole grain product. Through the use of whole grain durum flour, a white-style, whole grain bread for example, can be made in which cross-sectional slices of the bread have a consistent, homogeneous color and visual appearance. In addition, the use of whole grain durum flour provides for a white-style bread having the health advantages generally attributed to the inclusion of whole grains in the food product.

In one aspect, the disclosure is directed to representative embodiments of whole grain baked products made with whole grain durum wheat. Presently contemplated whole grain durum based baked products can comprise bread, biscuits, bagels, bread sticks, buns, cakes, rolls, English muffins, pizza crust, tortillas, pancakes, waffles, battered and breaded products such as, for example, corn dogs and breaded vegetables, cookies, soft and hard pretzels, crackers and the like.

The whole grain durum based baked products can comprise products in a variety of states such as, for example, raw, partially or par-baked, pre-baked, fresh baked and shelf-stable baked products. In some representative embodiments, these whole grain durum products can subsequently be refrigerated and/or frozen for use and/or storage.

In another aspect, the disclosure relates to embodiments of a non-fully-baked, whole grain dough, e.g., a raw or par-baked whole grain dough, made with whole grain durum flour. The whole grain dough can be freshly prepared for immediate use or can comprise a frozen or refrigerated whole grain durum dough for use at a time subsequent to dough preparation. Representative whole grain durum dough products can comprise pizza crust dough, bread dough, cake dough, roll dough, biscuit dough and bread stick dough.

In another aspect, the disclosure relates to embodiments of a whole grain baking mix made with whole grain durum flour for preparing white-like whole grain baked products. The whole grain mix can comprise a substantially anhydrous complete mix requiring only the addition of at least one liquid or wet ingredient such as, for example, water, oil and/or eggs, or a concentrated mix or premix comprising one or more functional ingredients blended into an amount of whole grain durum flour requiring the addition of bulk ingredients such as, for example, a bulk portion of whole grain durum flour and/or vital wheat gluten, at a time of preparation. Concentrated mixes or premixes can be formulated to include any number of functional ingredients based upon a desired level of completeness by a user of such concentrated mix or premix, which is frequently a commercial bakery or food service group. Representative whole grain durum mixes, in either a complete or concentrated mix/premix can comprise mixes for bread dough, pizza crust, cakes, brownies, cookies, pancake batter, muffins as well as variety baking mixes such as, for example, Bisquick® mix.

In another aspect, the disclosure relates to partially baked or "par-baked" whole grain product made with whole grain durum flour. Generally, the par-baked whole grain product requires an additional thermal processing step such as, for example, heating, baking, frying, microwaving and the like, to achieve a fully baked format.

In another aspect, representative methods for preparing a whole grain white-like baked product can comprise adding an effective amount of vital wheat gluten to a whole grain dough comprising whole gain durum flour so as to achieve acceptable baking results and eating characteristics for white-like baked products including Baked Specific Volume, slice height, symmetry and cell structure.

In another aspect, a representative embodiment of a whole grain baked product can comprise an amount of whole grain durum flour so as to achieve recommended whole grain levels as suggested and promulgated by the Whole Grains Council of Boston, Mass. For instance, whole grain durum baked products of the present disclosure can comprise levels of whole grain durum flour in an amount satisfying the "Good Source" standard of at least 8 grams of whole grains per serving. Alternatively, the whole grain durum baked products can comprise levels of whole grain durum flour in an amount satisfying the "Excellent Source" standard of at least 16 grams of whole grains per serving. Finally, the whole grain durum baked products can comprise whole grain durum flour satisfying the "100%/Excellent Source" standard wherein all of the grains are whole grains and the amount of whole grain comprises at least 16 grams of whole grain per serving. In some embodiments satisfying the "100%/Excellent Source" standard, whole grain durum flour can comprise 100% of the total whole grains within the whole grain durum baked product.

As used throughout the present disclosure, the term "white-like" refers to the visual appearance of an internal crumb for baked products having a color that is substantially similar to that of "white" baked products such as, for example, white bread. Representative examples of white bread can include Pillsbury Fresh White Bread and Wonder® Bread from Interstate Bakeries Corporation of Kansas City, Missouri. Traditionally, white baked products have been formulated and prepared with milled and refined grains, either bleached or unbleached. Conventional white bread products have had the bran and germ removed from the grain during milling and as such, generally lack the nutritional benefits associated with whole grains.

As used herein, "whole grain durum product" refers to non-pasta whole grain durum products such as, but not limited to, biscuits, bagels, bread sticks, buns, cakes, rolls, English muffins, pizza crust, tortillas, pancakes, waffles, batter-based products, breaded products, cookies, soft pretzels, hard pretzels and crackers.

BRIEF DESCRIPTION OF THE DRAWING

The disclosure may be more completely understood in consideration of the following detailed description of various representative embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure as defined by the appended claims.

DETAILED DESCRIPTION OF EMBODIMENTS

In representative embodiments of the invention as disclosed herein, "white-like" whole grain baked products and related products are comprised of milled whole grain durum wheat. An embodiment of the whole grain baked products and related products can be formulated such that the visually milled whole grain durum wheat comprises from about 0.1% to about 100% of the farinaceous content. In another alternative embodiment, the whole grain baked products and related products can be formulated such that white-like durum whole grain baked product comprises a "Good Source" of whole grain providing at least 8 grams of whole grain per serving. In another alternative embodiment, the whole grain baked products and related products can be formulated such that the white-like durum whole grain baked product comprises an "Excellent Source" of whole grain providing at least 16 grams of whole grain per serving.

Figure 1:
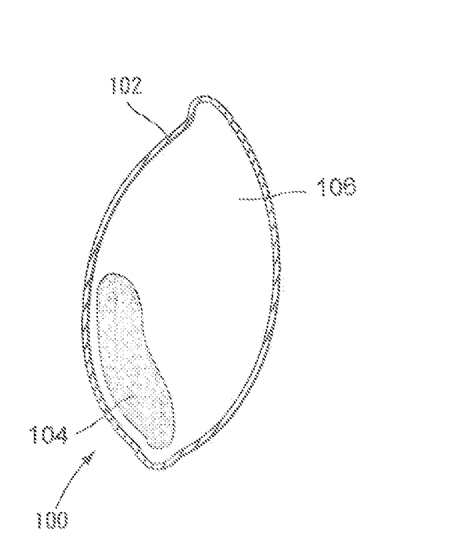
FIG. 1 is a representative depiction of a section view of a durum wheat kernel.

As illustrated in FIG. 1, a durum kernel 100 comprises a hard outer shell called bran 102, a nutrient-rich core called germ 104 and an interior starch portion called endosperm 106. Durum kernels differ from the kernels of the other wheat classes in that the bran 102, germ 104 and endosperm 106 all share the same generally homogeneous off-white color. When milled as a whole grain, the whole grain durum flour therefore has this homogeneous, off-white color wherein the color of grain fines and particulate matter are visually indistinguishable by an unassisted eye. As such, when whole grain durum wheat is used as or in the flour portion of a dough for baking, particulates and grain fines have a substantially consistent color, wherein the contrast between the fines and particulates is low. The consistent color characteristics of the durum kernel allows for the use of conventional milling processes for preparing optimal whole grain durum flour without requiring the use of potentially costly milling methods to achieve a homogeneous off-white color. Optimal whole grain durum flour is a whole grain durum flour in which the bran is visually indistinguishable from the germ and endosperm. For example, a representative durum whole grain flour for use in a white-like whole grain baked product as discussed herein can comprise the following representative particle size distribution:

TABLE 1

Representative Particle Size Distribution For Milled Whole Grain Durum Flour

| USBS Sieve Number | Particulate % on Mesh |
| --- | --- |
| 20 | 0.0-1.0 |
| 40 | 5.0-6.0 |
| 60 | 45.0-55.0 |
| 80 | 0.1-20.0 |
| 100 | .01-10.0 |
| Pan | 0.1-20.0 |

Whole grain durum flour as described herein is milled using conventional milling processes without requiring the use of a customized milling process such as, for example, requiring dedicated milling equipment or requiring the satisfaction of strict particle size ranges so as to provide a generally homogeneous off-white color for whole grain durum flour. As such, durum wheat can be milled using a conventional milling process such as, for example, a staged series of rolling operations wherein the grain kernel is progressively fractured and broken into smaller components wherein various sized components are removed from the rolling operation with sieves underneath the rollers. As the durum progresses through the stage rollers, the grain components are ground into finer and finer flour. As this progressive milling process is traditionally used in milling grains for use in existing refined and whole grain flours, in some instances no modification is necessary to an existing milling process to produce the whole grain durum flour as used and described herein.

The whole grain durum flour can be used within a variety of baked products and related products. For example, whole grain durum flour can be used in the preparation of whole grain baked products such as, for example, breads and whole grain biscuits having cross-sectional slices displaying a consistent, homogeneous color and visual appearance. In another example, whole grain durum flour can be used in baking kits, such as anhydrous mixes requiring the addition of wet ingredients such as, for example, water, oil, eggs the like, or in bulk concentrate mixes or premixes requiring the addition of additional bulk ingredients prior to baking. Whole grain durum flour can be used in preparing baking dough such as frozen dough, refrigerated dough and fresh dough. Whole grain durum flour can also be used in the preparation of partially-baked or "par-baked" products that require baking to completion prior to consumption. In addition, whole grain durum flour can be used in the preparation of "stiff" dough for use in crackers and pretzels.

As described throughout the specification, the attainment of certain dough characteristics are more important in some doughs than in others, and depend largely on the intended end use of the dough product. It will be understood that the term dough as used through the present specification applies equally to refrigerated, raw dough products. Certain products are formed as either a developed dough or an undeveloped dough. Developed dough is that in which a protein or gluten network has been more or less fully formed or created. Representative examples of developed doughs can include dough for breads, bagels, croissant or rolls. Undeveloped dough is that which, may lack sufficient protein or gluten to form a gluten network. One representative example of an undeveloped dough is biscuit dough. Cookie doughs may be considered undeveloped.

Dough formulations, and the ingredients they contain, can differ depending on the finished product that is obtained from the dough. However, most dough generally have a number of ingredients in common and examples of some such common ingredients are described and illustrated in more detail below.

The dough formulation and products as described herein generally contains a whole grain durum constituent that contributes to the structure of the dough. The whole grain durum constituent provides the dietary benefits associated with consumption of whole grains. As described herein, whole grain durum baked products, mixes and dough comprise at least about 15% whole grain durum flour within the flour constituent. In some contemplated embodiments, whole grain durum baked products, mixes and dough can comprise at least about 30% whole grain durum flour within the flour constituent. In other embodiments, whole grain durum baked products can comprise substantially all, or greater than about 90%, whole grain within the flour constituent. Whole grain durum flour can optionally be utilized in conjunction with other suitable whole grain flour such as, for example, red or white whole grain flour, or alternatively with a refined or unrefined white flour.

Whole grain dough compositions as described herein can be caused to expand (leaven) by any leavening mechanism, such as by one or more of the effects of entrapped gas such as entrapped carbon dioxide, entrapped oxygen, or both; a laminated dough structure; by action of chemical leavening agents; or by action of a biological agent such as a yeast. Thus, a leavening agent may be an entrapped gas such as layers or cells (bubbles) that contain carbon dioxide, water vapor, or oxygen, etc.; any type of yeast (e.g., cake yeast, cream yeast, dry yeast, etc.); or a chemical leavening system, e.g., containing a basic chemical leavening agent and an acidic chemical leavening agent that react to form a leavening gas such as carbon dioxide.

Examples of acidic chemical leavening agents are generally known in the dough and bread-making arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), glucono-delta-lactone (GDL), as well as a variety of others. Optionally, an acidic chemical leavening agent for use according to the invention, can be encapsulated.

Examples of basic chemical leavening agents include many that are generally known in the dough and baking arts, such as soda, i.e., sodium bicarbonate ($NaHCO_3$), potassium bicarbonate ($KHCO_3$), ammonium bicarbonate ($NH_4HCO_3$), etc. A basic chemical leavening agent may also be encapsulated, if desired.

The evolution of carbon dioxide essentially follows the stoichiometry of typical acid-base reactions. The amount of leavening base present determines the amount of carbon dioxide evolved, whereas the type of leavening acid affects the speed at which the carbon dioxide is liberated. The amount of leavening base used in combination with the leavening acid can be balanced such that a minimum of unchanged reactants remain in the finished product. An excess amount of leavening base can impart a bitter flavor to the final product, while excess leavening acid can make the baked product tart.

Yeast is also utilized for leavening baked goods, and is often preferred because of the desirable flavor it imparts to the dough. Baker's yeast is generally supplied in three forms: yeast cream, a thick suspension with about 17% solids; a moist press cake with about 30% solids; and an active dry yeast, with about 93 to 98% solids. Generally, active dry yeasts of acceptable quality have been available for some time, and recently instant active dry yeast has also been available for commercial use.

The quantity of yeast added to dough is directly related to the time required for fermentation, and the form of the yeast utilized. Generally, most bread doughs are made with from about 2 to 3% fresh compressed yeast, based on the amount of flour.

Whole grain dough as described herein can also contain additional functional ingredients. Some such additional ingredients can be used to modify the texture of dough. Texture modifying agents can improve many properties of the dough, such as viscoelastic properties, plasticity, or dough development. Examples of texture modifying agents include fats, emulsifiers, hydrocolloids, and the like.

Shortening helps to improve the volume, grain and texture of the final product. Shortening also has a tenderizing effect and improves overall palatability and flavor of a baked good. Either natural shortenings, animal or vegetable, or synthetic shortenings can be used. Generally, shortening is comprised of triglycerides, fats and fatty oils made predominantly of triesters of glycerol with fatty acids. Fats and fatty oils useful in producing shortening include cotton seed oil, ground nut oil, soybean oil, sunflower oil, rapeseed oil, sesame oil, olive oil, corn oil, safflower oil, palm oil, palm kernel oil, coconut oil, or combinations thereof.

Emulsifiers include nonionic, anionic, and/or cationic surfactants that can be used to influence the texture and homogeneity of a dough mixture, increase dough stability, improve eating quality, and prolong palatability. Emulsifiers include compounds such as lecithin, mono- and diglycerides of fatty acids, propylene glycol mono- and diesters of fatty acids, glyceryl-lacto esters of fatty acids, and ethoxylated mono- and diglycerides.

Hydrocolloids are added to dough formulations to increase moisture content, and to improve viscoelastic properties of the dough and the crumb texture of the final product. Hydrocolloids function both by stabilizing small air cells within the batter and by binding to moisture within the dough. Hydrocolloids include compounds such as xanthan gum, guar gum, and locust bean gum.

Dough-developing agents can also be added to the system to increase dough viscosity, texture and plasticity. Any number of agents known to those of skill in the art may be used including azodicarbonamide, diacetyl tartaric acid ester of mono- and diglycerides (D.A.T.E.M.) and potassium sorbate.

Another example of a dough-developing additive is PROTASE™. PROTASE™ is a proprietary product containing enzymes and other dough conditioners. PROTASE™ is generally used to reduce mixing time and improve machinability. A double strength version, PROTASE 2X™, is commercially obtained from J. R. Short Milling Co. (Chicago, Ill.).

Dough conditioners are also examples of dough additives. One example of a dough conditioner is NUBAKE™, commercially available from RIBUS (St. Louis, Mo.). Another example of a dough conditioner is L-cysteine, commercially available from B.F. Goodrich (Cincinnati, Ohio).

Dough can also frequently contain nutritional supplements such as vitamins, minerals and proteins, for example. Examples of specific nutritional supplements include thiamin, riboflavin, niacin, iron, calcium, or mixtures thereof.

Dough can also include flavorings such as sweeteners, spices, and specific flavorings such as bread or butter flavoring. Sweeteners include regular and high fructose corn syrup, sucrose (cane or beet sugar), and dextrose, for example. In addition to flavoring the baked good, sweeteners such as sugar can increase the moisture retention of a baked good, thereby increasing its tenderness.

Dough can also include preservatives and mold inhibitors such as sodium salts of propionic or sorbic acids, sodium diacetate, vinegar, monocalcium phosphate, lactic acid and mixtures thereof.

Preparation of whole grain durum products can be accomplished using traditional mixing methods to form a whole grain durum dough from milled whole grain durum flour. Generally, the whole grain durum flour can be combined with various wet ingredients such as, for example, water, oil, eggs and milk, using traditional mixers and mixing methods. For example, whole grain durum flour can be combined with suitable wet ingredients using any standard mixing technology such as, for example, a standard horizontal bar mixer or a paddle mixer available from the Hobart Corporation of Troy, Ohio.

Whole grain durum bread dough as used herein can comprise a variety of formulations wherein the flour portion of the bread dough can solely comprise milled whole grain durum flour or can comprise various combinations of milled whole grain durum flour as well as other whole grain flour or refined or unrefined flour. In some embodiments, a whole grain durum bread dough can be classified as a "Good Source," wherein the whole grain durum bread dough is formulated so as to provide 8 grams of whole wheat per serving (generally considered 2 slices or 50 grams of bread). In some embodiments, a whole grain durum bread dough can be classified as an "Excellent Source," wherein the whole grain bread dough is formulated so as to provide 16 grams of whole wheat per serving. In some embodiments, a whole grain durum bread dough can be classified as a "100%/Excellent Source," wherein the whole grain durum bread dough is formulated such that the flour portion of the bread dough solely comprises milled whole grain durum flour and exceeds 16 grams of whole wheat per serving.

As the percentage of milled whole grain durum flour increases in a bread dough, vital wheat gluten can be added in an effective amount so as to improve the bake qualities of a whole grain durum bread including increasing the Baked Specific Volume (BSV) of the whole grain durum bread. BSV is a term of art in the industry that defines the inverse of density or fluffiness of a baked good, and is simply the volume of the baked product divided by its weight. For bread products, BSV is frequently used as an objective measurement for non-sliced or artisan breads. Generally, a baked good is considered to have an acceptable BSV when the baked good doubles in size during baking from a raw dough to a baked dough product. More specifically, a traditionally accepted BSV for traditional white bread generally is at least about 3.0 cc/g. As such, effective amounts of vital wheat gluten for use with whole grain durum wheat bread dough can help achieve baked whole grain durum breads having a BSV of at least about 3.0 cc/g. Adding vital wheat gluten to a mixture comprising milled whole grain durum flour compensates for durum wheat's characteristics, which generally inhibits achieving desired baked good characteristics. In addition to formulating whole grain durum wheat bread dough with an effective amount of vital wheat gluten, effective amounts of vital wheat gluten can be added to baking mixes, either complete mixes or concentrated mixes or premixes, such that a user experiences the same baking performance as traditional mixes or mixtures based upon refined, wheat flour.

While BSV measurements can apply to a wide variety of baked products, frequently a slice height measurement is used in evaluating the baking performance of sliced breads. As loaves of sliced bread are typically baked in pans such that the overall baked shape of the bread loaf conforms to the pan, measuring the loaf or slice height can be an effective measurement of bake performance as the height is not constrained by the pan during baking. Using milled whole grain durum flour as described herein, whole grain durum sliced breads can be prepared having slice heights generally equivalent to those of traditional refined white sliced breads. For example, slice height measurements of at least about 4.0 inches, which are generally considered acceptable for refined white sliced breads can be achieved for whole grain durum sliced breads. In other embodiments, slice height measurements for whole grain durum sliced breads can be about 4.5 inches. To ensure slice height uniformity across the bread loaf, a plurality of spaced-apart slices within an individual bread loaf can be evaluated for slice height as described in U.S. Pat. No. 6,457,250 to Mingus et al.

In addition to use in preparing white-like whole grain breads, milled whole grain durum wheat can be similarly employed for use in whole grain durum baking mixes for preparing white-like whole grain durum baking products. These whole grain durum mixes can comprise a complete anhydrous mix requiring the addition of a liquid such as, for example, water, oil, eggs and/or milk, or a concentrate mix requiring additional bulk ingredients, as well as liquid ingredients, at a time of preparation. A complete mix is generally considered a mix in which all of the dry ingredients necessary for preparing a dough are present in the mix including the flour portion. A concentrate mix or premix is generally considered a mix including one or more key functional ingredients but still requiring addition of one or more bulk ingredients. At time of use, bulk ingredients such as, for example, a bulk flour portion and/or vital wheat gluten can be added to the concentrate mix or premix. Depending upon the application and the end user, representative whole grain durum mixes including blended whole grain durum flour can be provided at varying levels of completeness between the concentrate mix and the complete mix.

Key functional ingredients can comprise one or more of dough conditioners, hydrocolloids, protein sources, oxidizers, mold inhibitors, salt, and nutrients blended with flour, used to provide specific attributes to a finished baked product. Representative dough conditioners can comprise datum, enzymes, sodium stearoyl lactylate and monoglycerides. Representative hydrocolloids can comprise guar gum. Representative protein sources can comprise vital wheat gluten. Representative oxidizers can comprise ascorbic acid and azodicarbonamide. Representative mold inhibitors can comprise calcium propionate. Representative whole grain baking premixes can comprise effective amounts of functional ingredients such as, for example, vital wheat gluten, dough conditioners, emulsifiers, preservatives, salt, nutrients and the like, blended with whole grain durum flour.

Durum based whole grain bread dough mixes, either complete mixes or concentrated mixes or premixes, can include functional ingredients such that whole grain durum breads made from the mix achieve a BSV of at least about 3.0 cc/g and/or a slice height of at least about 4.0 inches. Alternatively, other whole grain durum products based on milled whole grain durum mixes, either complete mixes or concentrated mixes or premixes, can be specifically tailored to provide desirable characteristics to other baked products such as, for example, cookie spread for whole grain durum cookie mixes, slice height and cell structure for whole grain cake mixes, spread and height for whole grain pancakes. Further characteristics that can be tailored can include, for example, appropriate bake performance for other whole grain durum flour based mixes including pizza crust mixes, brownie mixes, muffin mixes and variety baking mixes such as, for example, Bisquick® mix.

EXAMPLES

In order to further illustrate the advantageous characteristics associated with the use of milled whole grain durum flour in preparing white-like breads, a variety of sample breads were formulated, mixed and baked to provide comparative data. These bread dough formulations include various comparative formulations made from grains other than milled whole grain durum wheat flour including bleached and unbleached refined flour, whole grain red wheat flour, whole grain white wheat flour and flour marketed under the trade name ULTRAGRAIN available from ConAgra Foods, Inc., of Omaha, Nebr. In addition each of the formulations included a concentrated mix or premix formula, formulated as either a traditional refined white bread premix or a whole grain durum flour premix.

As discussed herein, the premix formulations generally comprise one or more key functional ingredients blended with an amount of flour. Representative formulations for a traditional refined white bread premix and a milled whole grain durum flour premix are contained in Table 2 below.

TABLE 2

| Ingredient | Traditional Refined White Bread Premix (Amount by weight %) | Milled Whole Grain Durum Premix (Amount by weight %) |
|---|---|---|
| Refined White Flour | 60.0-99.0 | 0 |
| Whole Grain Durum Flour | 0 | 60.0-99.0 |
| Dough Conditioners (Datum) | 0.0-10.0 | 0.0-10.0 |
| Hydrocolloids | 0.0-5.0 | 0.0-5.0 |
| Protein Source | 0 | 0.0-15.0 |
| Oxidizers | 0.0-0.5 | 0.0-0.5 |
| Flour Enrichment | 0.1-2.0 | 0 |
| Mold Inhibitors | 0.0-1.0 | 0.0-1.0 |
| Salt | 0.0-5.0 | 0.0-5.0 |

Individual bread samples were prepared with formulations of differing levels of whole grains as contained in Table 3 below. At each level, comparative samples were prepared and evaluated.

TABLE 3

| Bread Smple | Bleached, Refined Flour | Unbleached, Refined Flour | Whole Durum Wheat Flour | Whole White Wheat Flour | Whole Red Wheat Flour | ULTRAGRAIN flour | Water |
|---|---|---|---|---|---|---|---|
| Sample 1: Comparative Bread Comprising 100% Bleached, Refined Flour | 47.1% | | | | | | 31.6% |
| Sample 2: Comparative Bread Comprising 100% Unbleached, Refined Flour | | 47.1% | | | | | 31.6% |
| Sample 3: Bread Comprising Whole Grain Durum Wheat Flour At Good Source Level | 31.0% | | 15.5% | | | | 32.0% |
| Sample 4: Bread Comprising Whole Grain Red Wheat Flour at Good Source Level | 31.0% | | 15.5% | | | | 32.0% |
| Sample 5: Bread Comprising Whole Grain White Wheat Flour at Good Source Level | 31.0% | | | 15.5% | | | 32.0% |
| Sample 6: Bread Comprising Whole Grain Durum Wheat Flour At Excellent Source Level | 15.3% | | 30.7% | | | | 31.7% |
| Sample 7: Bread Comprising Whole Grain Red Wheat Flour At Excellent Source Level | 15.3% | | | | 30.7% | | 31.7% |
| Sample 8: Bread Comprising Whole Grain White Wheat Flour At Excellent Source Level | 15.3% | | | 30.7% | | | 31.7% |
| Sample 9: Bread Comprising 92% Whole Grain Durum Wheat Flour | | | | 44.8% | | | 32.3% |
| Sample 10: Bread Comprising 92% Whole Grain Red Wheat Flour | | | | | 44.8% | | 32.3% |
| Sample 11: Bread Comprising 92% Whole Grain White Wheat Flour | | | | 44.8% | | | 32.3% |
| Sample 12: Bread Comprising 100% Whole Grain Durum Wheat Flour | | | 46.0% | | | | 31.7% |
| Sample 13: Bread Comprising 100% Whole Grain Red Wheat Flour | | | | | 46.0% | | 31.7% |
| Sample 14: Bread Comprising 100% Whole Grain White Wheat Flour | | | | 46.0% | | | 31.7% |
| Sample 15: Bread Comprising Whole Grain Durum-Red Wheat Blend Flour | | | 30.6% | | 15.4% | | 31.7% |
| Sample 16: Bread Comprising Whole Grain Durum-White Wheat Blend Flour | | | 30.6% | 15.4% | | | 31.7% |
| Sample 17: Bread Comprising ConAgra Ultra Grain Flour | 15.4% | | | | | 30.6% | 31.7% |

| Bread Smple | Yeast | Soy Oil | Durum Preimx | Refined White Premix | Vital Wheat Gluten | Hydrated Monoglyceride | High Fructose Corn Syrup |
|---|---|---|---|---|---|---|---|
| Sample 1: Comparative Bread Comprising 100% Bleached, Refined Flour | 2.1% | 1.4% | | 6.3% | 1.9% | 0.2% | 9.4% |
| Sample 2: Comparative Bread Comprising 100% Unbleached, Refined Flour | 2.1% | 1.4% | | 6.3% | 1.9% | 0.2% | 9.4% |
| Sample 3: Bread Comprising Whole Grain Durum Wheat Flour At Good Source Level | 2.1% | 1.4% | | 6.2% | 2.3% | 0.2% | 9.3% |
| Sample 4: Bread Comprising Whole Grain Red Wheat Flour at Good Source Level | 21.% | 1.4% | | 6.2% | 2.3% | 0.2% | 9.3% |
| Sample 5: Bread Comprising Whole Grain White Wheat Flour at Good Source Level | 21.% | 1.4% | | 6.2% | 2.3% | 0.2% | 9.3% |
| Sample 6: Bread Comprising Whole Grain Durum Wheat Flour At Excellent Source Level | 2.1% | 1.4% | | 6.1% | 3.2% | 0.2% | 9.2% |
| Sample 7: Bread Comprising Whole Grain Red Wheat Flour At Excellent Source Level | 2.1% | 1.4% | | 6.1% | 3.2% | 0.2% | 9.2% |
| Sample 8: Bread Comprising Whole Grain White Wheat Flour At Excellent Source Level | 2.1% | 1.4% | | 6.1% | 3.2% | 0.2% | 9.2% |
| Sample 9: Bread Comprising 92% Whole Grain Durum Wheat Flour | 2.1% | 1.3% | | 6.0% | 4.5% | 0.2% | 9.0% |
| Sample 10: Bread Comprising 92% Whole Grain Red Wheat Flour | 2.1% | 1.3% | | 6.0% | 4.5% | 0.2% | 9.0% |

TABLE 3-continued

| | | | | | | | |
|---|---|---|---|---|---|---|---|
| Sample 11: Bread Comprising 92% Whole Grain White Wheat Flour | 2.1% | 1.3% | | 6.0% | 4.5% | 0.2% | 9.0% |
| Sample 12: Bread Comprising 100% Whole Grain Durum Wheat Flour | 2.1% | 1.4% | 6.0% | | 3.2% | 0.2% | 9.2% |
| Sample 13: Bread Comprising 100% Whole Grain Red Wheat Flour | 2.1% | 1.4% | 6.0% | | 3.2% | 0.2% | 9.2% |
| Sample 14: Bread Comprising 100% Whole Grain White Wheat Flour | 2.1% | 1.4% | 6.0% | | 3.2% | 0.2% | 9.2% |
| Sample 15: Bread Comprising Whole Grain Durum-Red Wheat Blend Flour | 2.1% | 1.4% | 6.0% | | 3.2% | 0.2% | 9.2% |
| Sample 16: Bread Comprising Whole Grain Durum-White Wheat Blend Flour | 2.1% | 1.4% | 6.0% | | 3.2% | 0.2% | 9.2% |
| Sample 17: Bread Comprising ConAgra Ultra Grain Flour | 2.1% | 1.4% | | 6.1% | 3.2% | 0.2% | 9.2% |

The individual bread samples were evaluated for objective testing purposes. A first analysis was conducted with respect to the color or "lightness" of the bread. For some consumers, particularly children, lightness is generally associated with taste. The internal crumb color of breads can be objectively measured using standard techniques known to one in the art such as, for example, using a Minolta Chroma Meter available from the Minolta Corporation of Ramsey, New Jersey, to measure the reflective color of a surface. Using the Minolta Chroma Meter, the appearance of bread can be measured using the L*a*b color scale, wherein "L*" corresponds to a lightness measurement based on a black to white scale, "a*" corresponds to measurements on a red to green scale and "b*" corresponds to measurements on a blue to yellow scale. For purposes of comparing various bread crumbs, the "L*" measurement quantifies how light a crumb is. "L*" measurements are based on a scale from 0-100 with 0 being black and 100 being white. A crumb from a traditional white bread generally has an "L*" measurement ranging from about 75-85. Each of the of the various bread samples had their crumb analyzed for lightness using the Minolta Chroma Meter.

In addition to objective color testing of the bread sample, additional objective testing was conducted relative to the baking performance of each bread sample. For each bread sample, both BSV testing and slice height measurements were conducted. BSV was determined by measuring a samples volume and dividing the sample by its mass. Slice height measurements were determined by measuring the slice using the template disclosed in Mingus et al. which was previously incorporated by reference.

Finally, each of the breads was compared using the bread template scoring system described in Mingus et al. The scoring template provides visual comparison means for an unassisted eye in determining whether bread is meeting various bread appearance criteria such as, for example, bread symmetry and cell structure size. For purposes of grading the appearance of the bread prepared from the above sample formulations, breads were given a score of "P" for passing, "A" for acceptable and "F" for failure.

Results for the various measurements were as contained in Table 4 below:

TABLE 4

| | "L*" | Baked Specific Volume | Slice Height | Visual Template Measurements | | | | | |
|---|---|---|---|---|---|---|---|---|---|
| | | | | Symmetry | | | Cell Size | | |
| Sample | Measurement | (cc/g) | (inches) | P | A | F | P | A | F |
| 1 | 81.2 | 3.69 | 4.3 | 5 | 1 | 0 | 5 | 1 | 0 |
| 2 | 80.3 | 3.65 | 4.5 | 4 | 2 | 0 | 4 | 2 | 0 |
| 3 | 76.8 | 3.56 | 4.4 | 6 | 0 | 0 | 5 | 1 | 0 |
| 4 | 72.9 | 3.86 | 4.7 | 5 | 1 | 0 | 5 | 1 | 0 |
| 5 | 76.5 | 3.89 | 4.2 | 6 | 0 | 0 | 5 | 1 | 0 |
| 6 | 75.7 | 4.58 | 4.5 | 6 | 0 | 0 | 4 | 1 | 1 |
| 7 | 70.0 | 4.52 | 4.6 | 6 | 0 | 0 | 6 | 0 | 0 |
| 8 | 71.8 | 3.73 | 4.4 | 6 | 0 | 0 | 6 | 0 | 0 |
| 9 | 72.7 | 4.53 | 4.6 | 6 | 0 | 0 | 3 | 3 | 0 |
| 10 | 65.7 | 3.95 | 4.5 | 1 | 5 | 0 | 6 | 0 | 0 |
| 11 | 70.0 | 4.48 | 4.3 | 5 | 1 | 0 | 6 | 0 | 0 |
| 12 | 71.6 | 3.13 | 4.3 | 6 | 0 | 0 | 5 | 1 | 0 |
| 13 | 63.2 | 3.25 | 4.3 | 5 | 1 | 0 | 6 | 0 | 0 |
| 14 | 69.5 | 3.28 | 4.2 | 6 | 0 | 0 | 6 | 0 | 0 |
| 15 | 68.8 | 3.46 | 4.2 | 6 | 0 | 0 | 5 | 1 | 0 |
| 16 | 71.9 | 3.16 | 4.0 | 6 | 0 | 0 | 5 | 1 | 0 |
| 17 | 72.0 | 4.21 | 4.2 | 6 | 0 | 0 | 5 | 1 | 0 |

From the various sample testing, it was observed that the milled whole grain durum based sample formulations compared favorably to the comparative formulations for each level of whole grain and generally exceed the performance, relative to being a white-like product, when compared to similarly formulated samples using red wheat and white wheat whole grains. All of the whole grain durum based samples (Samples 3, 6, 9, 12, 15 and 16) had a BSV exceeding 3.0 cc/g, a slice height of at least 4.0 inches and either passed or were considered acceptable when symmetry and cell structure were analyzed using the bread template scoring system. It was observed that the milled whole grain durum based samples each appeared white-like and individual particulate matter was indistinguishable when observed by the unassisted eye. In addition, every milled whole grain durum based sample was more white-like or had a higher "L*" value than the corresponding sample having a similar level of whole grain red wheat or whole grain white wheat. In addition, milled whole grain durum based Samples 3 and 6 satisfied the generally accepted lightness standard or "L*" value of greater than 75 for traditional white breads. As demonstrated by the testing, white-like whole grain durum baked products based upon milled whole grain durum flour can be formulated and prepared that satisfy the criteria for appearance and texture of traditional white breads formulated with refined flour. In addition, whole grain durum baked products made from milled whole grain durum flour are generally lighter or more white-like than similar whole grain baked products made from whole grain red or white flour.

Although various embodiments of the present invention have been disclosed here for purposes of illustration, it should be understood that a variety of changes, modifications and substitutions may be incorporated without departing from either the spirit or scope of the present invention.

What is claimed:

1. A method for making a visually homogeneous off-white whole grain baked product having a visually substantially homogeneously-colored particulate matter, comprising:
    providing an off-white whole grain durum wheat flour comprising particulates and fines of durum wheat bran, germ and endosperm that are visually substantially homogeneously-colored in the flour;
    mixing said whole grain durum flour at a level of at least about 60% by weight of a farinaceous content of the whole grain baked product with vital wheat gluten and at least one wet ingredient to form a whole grain dough product; and
    subjecting the whole grain dough product to a thermal processing step to form the whole grain baked product and to provide the whole grain baked product with a specific volume of at least about 3.0 cc/g.

2. The method of claim 1, wherein the whole grain durum flour is mixed at a level of about 100% by weight of the farinaceous content of the whole grain baked product.

3. The method of claim 1, further comprising processing the whole grain durum wheat flour so that at least 50% by weight of the whole grain durum wheat flour has a particle size greater than 250 microns prior to forming the whole grain dough product.

4. The method of claim 1, further comprising the step of refrigerating the whole grain dough product prior to subjecting the whole grain dough to the thermal processing step.

5. The method of claim 1, further comprising the step of freezing the whole grain dough product prior to subjecting the whole grain dough to the thermal processing step.

6. The method of claim 5, further comprising the step of partially baking the whole grain dough product prior to freezing the whole grain dough product.

7. A visually homogeneously off-white whole grain baked product made by the method of claim 1.

8. A method for providing an internal crumb of a whole grain durum wheat baked product with an "L*" measurement greater than an "L*" measurement of a comparative baked product containing a similar level of whole grain red wheat or whole grain white wheat, comprising:
    providing an off-white whole grain durum wheat flour comprising particulates and fines of bran, germ and endosperm that are visually substantially homogeneously-colored when viewed with an unassisted eye;
    mixing said whole grain durum flour at a level of at least about 60% by weight of a farinaceous content of the whole grain baked product with one wet ingredient to form a whole grain dough product.

9. The method of claim 8, further comprising subjecting the whole grain dough product to a thermal processing step to form the whole grain durum wheat baked product and to provide the baked product with a specific volume of at least about 3.0 cc/g.

10. The method of claim 8, further comprising processing the whole grain durum wheat flour so that at least 50% by weight of the whole grain durum wheat flour has a particle size greater than 250 microns prior to forming the whole grain dough product.

11. The method of claim 8, further comprising adding vital wheat gluten prior to mixing the whole grain durum flour with the wet ingredient.

12. The method of claim 8, further comprising the step of refrigerating the whole grain dough product.

13. The method of claim 8, further comprising the step of freezing the whole grain dough product.

14. The method of claim 13, further comprising the step of partially baking the whole grain dough product prior to freezing the whole grain dough product.

15. A whole grain durum Wheat baked product made by the method of claim 9.

* * * * *